(12) United States Patent
Rubtsov et al.

(10) Patent No.: US 10,419,568 B2
(45) Date of Patent: Sep. 17, 2019

(54) MANIPULATION OF BROWSER DOM ON SERVER

(71) Applicant: MICROSOFT TECHNOLOGY LICENSING, LLC, Redmond, WA (US)

(72) Inventors: Vitaly L. Rubtsov, Redmond, WA (US); Boris Asipov, Bellevue, WA (US); Michael Aksionkin, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 15/089,347

(22) Filed: Apr. 1, 2016

(65) Prior Publication Data
US 2017/0289293 A1  Oct. 5, 2017

(51) Int. Cl.
H04L 29/08 (2006.01)

(52) U.S. Cl.
CPC .......... *H04L 67/2823* (2013.01); *H04L 67/02* (2013.01); *H04L 67/146* (2013.01)

(58) Field of Classification Search
CPC .... H04L 67/2823; H04L 67/02; H04L 67/146
See application file for complete search history.

(56) References Cited

U.S. PATENT DOCUMENTS

| | | |
|---|---|---|
| 6,393,605 B1 | 5/2002 | Loomans |
| 7,020,882 B1 | 3/2006 | Lewallen |
| 7,614,052 B2 | 11/2009 | Wei |
| 7,814,475 B2 | 10/2010 | Cohen et al. |
| 7,971,194 B1 | 6/2011 | Gilboa |
| 8,566,807 B1 | 10/2013 | Colton et al. |
| 2002/0143949 A1* | 10/2002 | Rajarajan ............ G06F 9/5055 709/226 |
| 2002/0184373 A1* | 12/2002 | Maes .................. G10L 15/30 709/228 |

(Continued)

OTHER PUBLICATIONS

"A Guide to Building Enterprise Applications on the .NET Framework", Published on: Sep. 2003 Available at: <https://msdn.microsoft.com/en-us/library/ms954601.aspx>.
"Html dom Manipulate in asp.net mvc", Retrieved on: Oct. 16, 2015 Available at: <http://forums.asp.net/t/1587847.aspx?Html+dom+Manipulate+in+asp+net+mvc>.

(Continued)

*Primary Examiner* — Scott B Christensen
(74) *Attorney, Agent, or Firm* — Fiala & Weaver P.L.L.C.

(57) ABSTRACT

Methods, systems, apparatuses, and computer program products are provided for enabling server-side web application execution by maintaining a server-side DOM that is mirrored at the client-side. A client-side DOM is rendered in a browser at a client computing device and corresponds to a server-side DOM at a server. An event indication associated with the client-side DOM is received from a client-side event manager at the client computing device. The received event indication is provided to server-side application code defining a web application to which the client-side DOM corresponds. An instruction is generated by the server-side application code based on the event indication. The server-side DOM is modified in response to the instruction. An indication of the modification is provided to a client-side DOM manager at the client computing device to apply to the client-side DOM, thereby synchronizing the client-side DOM to the server-side DOM.

20 Claims, 4 Drawing Sheets

(56) References Cited

U.S. PATENT DOCUMENTS

| | | | |
|---|---|---|---|
| 2004/0103373 A1* | 5/2004 | Wei | G06F 17/2247 |
| | | | 715/234 |
| 2004/0143823 A1* | 7/2004 | Wei | G06F 8/41 |
| | | | 717/140 |
| 2005/0198365 A1* | 9/2005 | Wei | G06F 17/2247 |
| | | | 709/237 |
| 2007/0005606 A1* | 1/2007 | Ganesan | G06F 17/30864 |
| 2010/0115023 A1 | 5/2010 | Peled | |
| 2011/0015917 A1* | 1/2011 | Wang | G06F 9/455 |
| | | | 703/23 |
| 2011/0035435 A1* | 2/2011 | Meng | G06F 9/54 |
| | | | 709/203 |

OTHER PUBLICATIONS

".NET Development (manipulate dam with .net)", Retrieved on: Oct. 16, 2015 Available at: <https://books.google.co.in/books?id=ZLBOHPDfCrYC&pg=PA206&lpg=PA206&dq=manipulate+dom+witnet&source=bl&ots=Km_WHkqPS&sig=jSSDtM4teXUxZDVJeRvpppl1szk&hl=en&sa=X&ved=0CFcQ6AEwCWoVChMlub-R4-3NyAIVUh6OCh0uNAMf#v=onepage&q=manipulate%20dom%20with%20.net&f=false>.

"DOM Manipulation", Published on: Dec. 26, 2014 Available at: <http://blog.garstasio.com/you-dont-need-jquery/dom-manipulation/>.

"Running a .net application on a server", Published on: Aug. 14, 2007 Available at: <http://weblogs.sqlteam.com/jhermiz/archive/2007/08/14/60284.aspx>.

* cited by examiner

MANIPULATION OF BROWSER DOM ON SERVER

BACKGROUND

In computing, a web application (also known as "web app") is a client-server software application that runs in a web browser. A web application is implemented in the form of code that is downloaded from a server to a client computer and executed in the web browser at that client computer. The web browser functions as the client to run, update, and maintain the web application. Examples formats of web application code include standard formats such as HTML (hypertext markup language) and JavaScript, which are supported by a variety of web browsers. The client-side web application code may access the server for data, but code for a web application primarily executes in the browser. Common types of web applications include webmail, online retail sales, online auctions, wikis, instant messaging services.

To render a web application document such as an HTML page, most web browsers use an internal object model similar to the DOM (document object model). DOM is a cross-platform and language-independent convention for representing and interacting with objects in HTML, XHTML (extensible HTML), and XML (extensible markup language) documents. The nodes of every document are organized in a tree structure, called the DOM tree. Objects in the DOM tree may be addressed and manipulated by using methods on the objects. For example, the web browser may execute JavaScript code of a web application that interacts with the DOM tree objects of the web application's HTML code.

Due to the object model, JavaScript is enabled to create dynamic web applications. JavaScript can add, change, and remove the HTML elements and attributes in an HTML document. Furthermore, JavaScript can change all the CSS (cascading style sheets) styles in the document, can react to all existing events in the document, and can create new events in the document.

Today, dynamic web applications cannot be built without learning JavaScript and the various frameworks used to develop the code that runs in the web browser.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for enabling server-side web application execution by maintaining a server-side DOM that is mirrored at the client-side.

A client-side DOM is rendered in a browser at a client computing device and corresponds to a server-side DOM at a server. An event indication associated with the client-side DOM is received from a client-side event manager at the client computing device. The received event indication is provided to server-side application code defining a web application to which the client-side DOM corresponds. An instruction is generated by the server-side application code based on the event indication. The server-side DOM is modified in response to the instruction. An indication of the modification is provided to a client-side DOM manager at the client computing device to apply to the client-side DOM, thereby synchronizing the client-side DOM with the server-side DOM.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
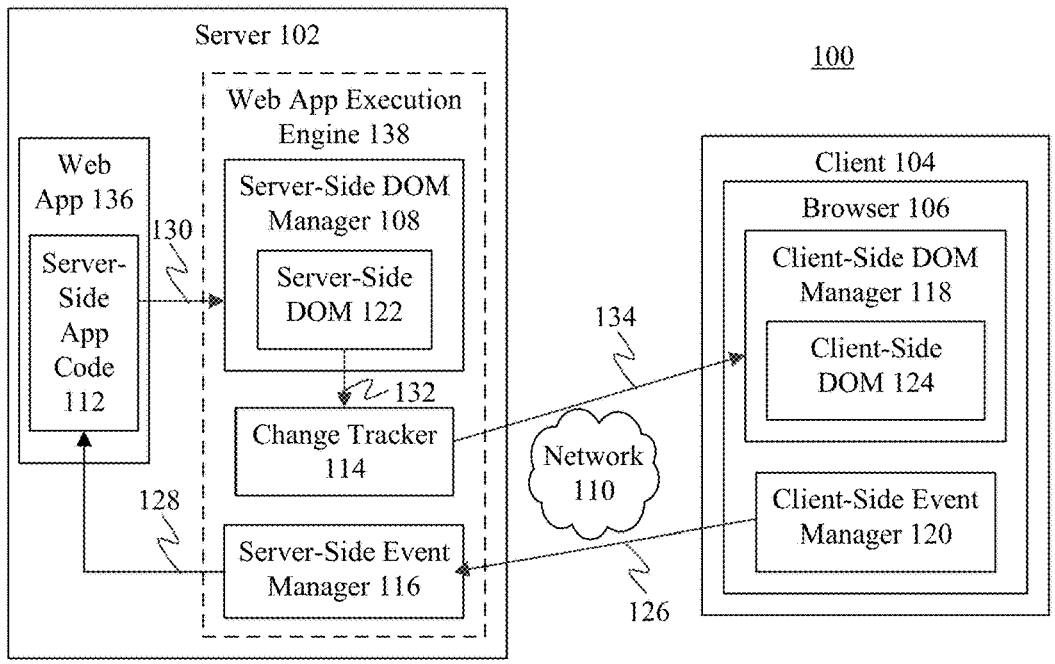
FIG. 1 shows a client-server communication system configured to support a web application that operates based on server-side code execution and client-side events, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Enabling Manipulation of Browser Document Object Model on a Server In computing, a web application or web app is a client-server software application that runs in a web browser. A traditional web application is implemented in the form of code that is downloaded from a server to a client computer and executed in the web browser at that client computer. The client-side web application code may access the server for data, but code for a web application traditionally executes in the browser.

To render a web application document such as an HTML page, most web browsers use an internal object model similar to the DOM (document object model). DOM is a cross-platform and language-independent convention for representing and interacting with objects in HTML, XHTML (extensible HTML), and XML (extensible markup language) documents. The nodes of every document are organized in a tree structure, called the DOM tree. Objects in the DOM tree may be addressed and manipulated by using methods on the objects. For example, the web browser may execute JavaScript code of a web application that interacts with the DOM tree objects of the HTML code of the web application. Thus, the browser can manipulate the web application's DOM (which is local to the browser), but the server cannot.

Using the object model, JavaScript is enabled to create dynamic web applications. JavaScript can add, change, and remove all the HTML elements and attributes in an HTML document. Furthermore, JavaScript can change all the CSS (cascading style sheets) styles in the document, can react to all existing events in the document, and can create new events in the document.

Today, dynamic web applications cannot be built without learning JavaScript and the various frameworks used to develop the code the runs in the web browser. For instance, prior to this invention, no way existed to write web applications entirely in C# or other server-side (non-browser) language, and no way existed to manipulate the client-side browser DOM from the server side.

Embodiments enable access to a web browser's HTML DOM directly by server-side code such as C#, so that a web application can run primarily on the server, and yet provide sufficiently rapid responsiveness (e.g., similar to AJAX (asynchronous JavaScript and XML)) without the web application having JavaScript code running in the client-side browser. This enables developers familiar with server-side code development (e.g., the .NET framework, etc.) to build rich web applications efficiently. This enables the developer to be free of having to use JavaScript or frameworks like jQuery, Angular, React, etc.

Typically, server side and client side application code are developed using different languages, for example Python+ JavaScript. According to embodiments, a web application can be developed using one, strongly typed server language (e.g., a .NET language) such as C# or VB.NET. This enables easier web application maintenance as well.

Embodiments reduce the barriers to entry for many developers who are not familiar with JavaScript or other web browser-friendly scripting languages. Embodiments do not trans-compile C# into JavaScript. The web application code is executed on the server (e.g., by .NET CLR) and thus can be easily debugged using a server-side development tool (e.g., Microsoft Visual Studio) similar to a desktop application. Embodiments utilize a server-side (virtual) DOM, which is accessible to the server-side web application code. Changes to the server-side DOM are instantly synced to the web browser DOM at the client over any suitable communication protocol (e.g., Web Sockets). Events on the client side, such as mouse clicks or other interactions with the web application in the browser, are sent back to the web application code on the server-side and processed. Any changes are first implemented to the server-side DOM, and then replicated in the client-side DOM.

Embodiments may be implemented in various ways. For instance, FIG. 1 shows a client-server communication system 100 configured to support a web application (web app) 136 that operates based on server-side code execution and client-side events, according to an example embodiment. As shown in FIG. 1, system 100 includes a server 102 and a client 104. Server 102 includes web app 136 and web app execution engine 138. Web app execution engine 138 includes a server-side DOM manager 108, a change tracker 114, and a server-side event manager 116. Web app 136 includes server-side app code 112. Client 104 includes a browser 106. Browser 106 includes a client-side DOM manager 118 and a client-side event manager 120. System 100 is described as follows.

Server 102 and client 104 may each be any type of stationary or mobile computing device, including those described elsewhere herein. For instance, client 104 may be a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, a smart watch, etc.), or a stationary computing device such as a desktop computer or PC (personal computer). Server 102 may be one of these examples of client 104, may be a server device is a server rack, or may be other type of server.

Server 102 and client 104 may each include at least one network interface that enables communications with each other over network 110. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, etc. Further examples of network interfaces are described elsewhere herein. Examples of network 110 include a local area network (LAN), a wide area network (WAN), a personal area network (PAN), and/or a combination of communication networks, such as the Internet.

Web app 136 is defined by server-side app code 112. Server-side app code 112 includes program code that defines the functionality of web app 136. Server-side app code 112 may be coded in one or more types of programming languages suitable for server-side operation, such as such as C#, C++, VB.NET, other .NET language, or other language that conforms to the Common Language Infrastructure (CLI) specifications, etc.

Browser 106 in client 104 is a web browser application that interprets and displays pages of web app 136, and enables a user to interact with the pages, thereby functioning as the user interface for web app 136. Browser 106 is capable of executing code of one or more browser-compatible programming languages, including markup languages (e.g., HTML, XHTML, XML, etc.), client-side scripting languages (e.g., JavaScript, etc.), and/or other browser-compatible programming languages. Examples of browser 106 include Internet Explorer®, developed by Microsoft Corp. of Redmond, Wash., Mozilla Firefox®, developed by Mozilla Corp. of Mountain View, Calif., Safari®, developed by Apple Inc. of Cupertino, Calif., and Google® Chrome of Mountain View, Calif.

Server-side DOM manager 108 is configured to manage a server-side DOM 122 at server for web app 136. Server-side DOM 122 is defined by an object model the same as, similar to, or logically/functionally equivalent to the DOM convention defined for representing objects in markup language documents. In server-side DOM 122, the nodes of web app 136 are organized in a tree structure, called the DOM tree. Objects in the DOM tree (e.g., HTML elements) may be addressed and manipulated by using methods on the objects. Traditionally, a web browser would execute JavaScript or other client-side code of a web application that interacts with the DOM tree objects of the HTML code of the web application. In contrast, in embodiments, server-side app code 112 of web app 136 is configured to address and manipulate the objects of server-side DOM 122. In this manner, web app 136 may be implemented in server-side app code 122 rather than in client-side code that operates in browser 106. Server-side app code 122 is capable of adding, changing, and/or removing the HTML (or other markup language) elements and attributes in a page of web app 136. Furthermore, server-side app code 122 can change the CSS (cascading style sheets) styles in web app 136, can react to events occurring at browser 106 with respect to web app 136, and can create new events in web app 136.

Accordingly, server-side DOM manager 108 is configured to modify server-side DOM 122 in response to instructions 130 from server-side app code 112. Instructions 130 may be generated in server-side app code 122 alone or in conjunction with events occurring at the user interface provided at browser 106 for web app 136. Instructions 130 may be provided to server-side DOM 122 in any manner, such as in the form of API (application programming interface) calls (e.g., when server-side DOM manager 108 includes an API), or in any other manner. The use of API calls enables any number of web applications to interface with server-side DOM manager 108 in a standardized manner (e.g., according to a standardized instruction format), which enables web app execution engine 138 to handle any number of different types of web applications in a common manner. Instructions 130 can add, change, and/or remove elements and attributes of web app 136, change the CSS, styles in web app 136, and make any other additions, deletions, and/or modifications to the elements and attributes of web app 136 (as traditionally performed by web browsers).

For example, change tracker 114 is configured to track modifications 132 made to server-side DOM 122 by server-side DOM manager 108. Modifications 132 indicate all additions, deletions, and/or modifications made to the object model of server-side DOM 122. For example, modifications 132 may indication an identifier for any changed/added/deleted node, an indication of the modification for each identified node, indications of any changed attributes, and/or any other modifications. Change tracker 114 is configured to provide indications of the tracked modifications 132 to client 104 as modification indications 134. For example, server 102 may transmit modification indications 134 to client 104 through network 110 in any manner, including transmitting modification indications 134 according to the TCP/IP (transmission control protocol/Internet protocol) protocol, including according to the Web Socket protocol (providing full-duplex communication channels over a single TCP connection), or according to another manner.

Browser 106 at client 104 receives modification indications 134. Browser 106 renders a client-side DOM 124 corresponding to server-side DOM 122. At web app 136 start-up, server-side DOM manager 108 generates server-side DOM 122 according to server-side app code 112, and transmits an indication of the structure of server-side DOM 122 to client-side DOM manager 118 in browser 106. Based on this received information, browser 106 generates client-side DOM 124. Furthermore, browser 106 updates client-side DOM 124 each time client-side DOM manager 118 receives modification indications 134. In other words, based on modification indications 134, browser 106 renders client-side DOM 124 to correspond to server-side DOM 122, implementing modification indications 134 in client-side DOM 124, thereby mirroring server-side DOM 122 in client-side DOM 124.

A user may interact with browser 106 to interact with the displayed user interface of web app 136 at client 104. For example, the user may provide mouse clicks, mouse movement, key strokes (e.g., key up, key down, etc.), change events to elements (e.g., check box, menu selection, etc.), voice inputs, haptic inputs, touch inputs, button pushes, etc., via the user interface provided by browser 106. In embodiments, such interactions may generate "events," which are first reflected in server-side DOM 122 before being mirrored in client-side DOM 124.

For example, when such interactions occur, client-side event manager 120 in browser 106 may register the interactions, and transmit such interactions as event indications 126 to server-side event manager 116. Client 104 may transmit event indications 126 to server 102 through network 110 in any manner, including transmitting modification indications 134 according to the TCP/IP protocol or in another manner.

Server-side event manager 116 is configured to receive event indications 126 associated with client-side DOM 124 from client-side event manager 120 at client 104, and provide event indications 126 as event indications 128 to server-side app code 112. Server-side app code 112 generates instructions 130 based at least on event indications 128. Instructions 130 may cause modifications to server-side DOM 122, which as described above, are transmitted by change tracker 114 to client-side DOM manager 118 to be made in client-side DOM 124, which is rendered in accordance with the modifications by browser 106 for display to the user.

Further description of embodiments is provided in the following subsections. For instance, exemplary embodiments for initiating a web application having a server-side DOM are described in the next subsection, followed by a subsection describing exemplary systems and operations of a web application having a server-side DOM. A third subsection shows exemplary server-side application code enabled by the embodiments described herein, to replace client-side application code that would otherwise run in a browser in traditional implementations.

Figure 2:
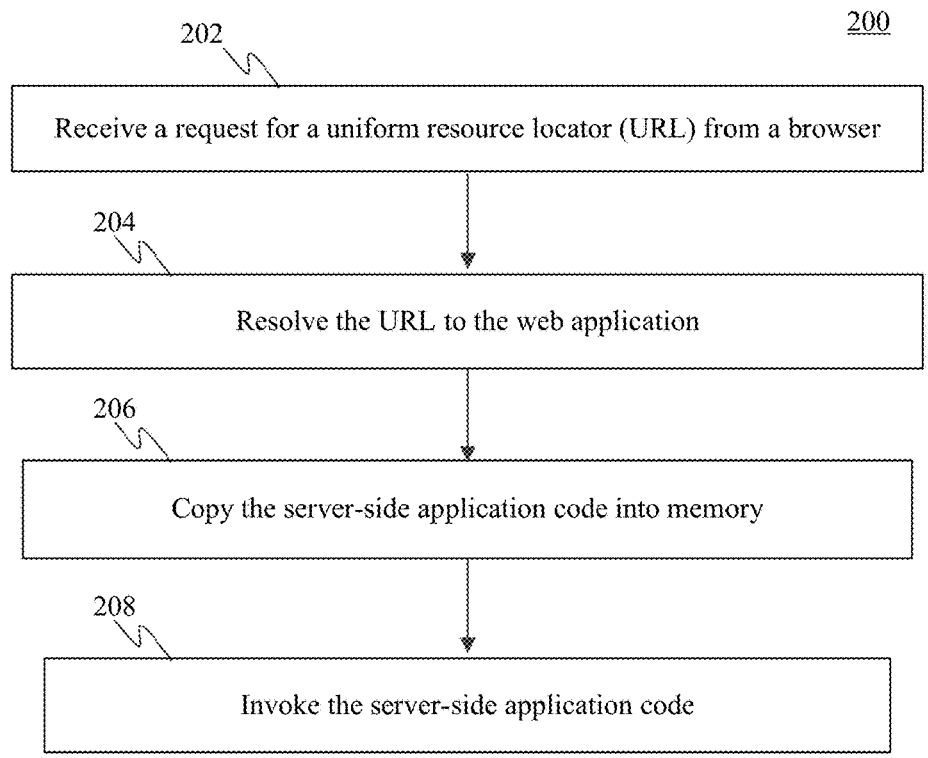
FIG. 2 shows a flowchart providing a process for initiating a web application, in a client-server system, that operates based on server-side code execution and client-side events, according to an example embodiment.
Figure 3:
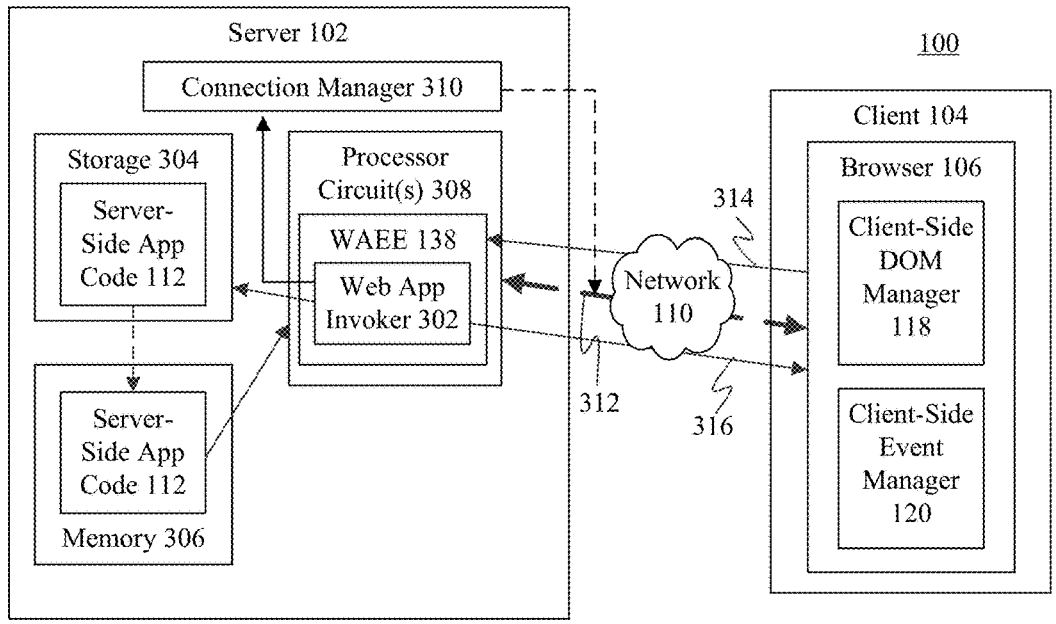
FIG. 3 shows the client-server communication system of FIG. 1 initiating the web application that operates based on server-side code execution and client-side events, according to an example embodiment.

A. Exemplary Embodiments for Initiating a Web Application that has a Server-Side DOM Operation of a web application that is based on a server-side DOM (such as web app 136 of FIG. 1) may be initiated in various ways, according to embodiments. For instance, FIG. 2 shows a flowchart 200 providing a process for initiating a web application that operates based on server-side code execution and client-side events, according to an example embodiment. For purposes of illustration, flowchart 200 is described with respect to FIG. 3. FIG. 3 shows client-server communication system 100 of FIG. 1 configured to initiate web app 136, according to an example embodiment. As shown in FIG. 3, server 102 includes web app execution engine 138, storage 304, memory 306, one or more processor circuits 308, and a connection manager 310. Web app execution engine 138 includes web app invoker 302. In an embodiment, web app invoker 302 may perform flowchart 200. FIG. 3 and flowchart 200 are described as follows.

Flowchart 200 of FIG. 2 begins with step 202. In step 202, a request for a uniform resource locator (URL) is received from a browser. For example, as shown in FIG. 3, browser 106 may transmit a URL request 314 received by server 102. URL request 314 is generated by browser 106 in response to an action at client 104, such as by a user of client 104 clicking on a hyperlink displayed in a page by browser 106. Taking this action causes a web application to be invoked. URL request 314 indicates a web address (e.g., a hostname or IP address, a path, etc.) that is a reference to the web application, such as web app 136 at server 102 (in FIG. 1).

In step 204, the URL is resolved to the web application. In the embodiment of FIG. 3, web app execution 138 (executing in processor circuit(s) 308) receives URL request 314 and is configured to process URL request 314. For example, web app invoker 302 may resolve the web address included URL request 314 to web app 136, such as by a hostname in the web address of URL request 314 mapping to server 102, and a path included in the web address mapping to web app 136 in server 102.

In step 206, the server-side application code is copied into memory. In an embodiment, upon resolving the web address of URL request 314 to web app 136, web app invoker 302 may determine a location in storage 304 for server-side app code 112, and may copy server-side app code 112 from storage 304 into memory 306. For instance, storage 304 may be secondary storage, and may include one or more of any type of storage mechanism, including a magnetic disc (e.g., in a hard disk drive), an optical disc (e.g., in an optical disk drive), a magnetic tape (e.g., in a tape drive), a memory device such as a RAM (random access memory) device, a ROM (read only memory) device, etc., and/or any other suitable type of storage medium. Memory 306 may be primary storage or main memory to which program code is copied for more efficient execution by processor circuit(s) 208, and may include one or more types of memory, including volatile memory (e.g., static RAM, dynamic RAM, etc.) and/or non-volatile memory (e.g., flash memory, etc.).

In step 208, the server-side application code is invoked. In an embodiment, processor circuit(s) 308 access server-side app code 112 in memory 306, and execute server-side app code 112. Processor circuit(s) 308 includes one or more physical processors, such as a central processing unit (CPU), a microcontroller, a microprocessor, and/or another hardware processor type configured to execute program code.

Note that in embodiment, web app invoker 302 may instruct connection manager 310 to establish one or more connections between server 102 and client 104 for communications related to web app 136. For instance, as shown in FIG. 3, connection manager 310 may be configured to open a connection 312 between client 104 and server 102. Connection 312 may be a single connection established according to a bi-directional protocol (e.g., the WebSocket protocol), or may contain multiple connections established according to one or more unidirectional protocol. Connection manager 310 is configured to maintain connection 312 between client 104 and server 102 during a session of web app 136 (e.g., during multiple transmissions of event indications 126 from client 104 to server 102 and multiple transmissions of modification indications 134 from server 102 to client 104. By maintaining connection 312 open during the operation of web app 136, low latency operation of web app 136 may be achieved.

Figure 4:
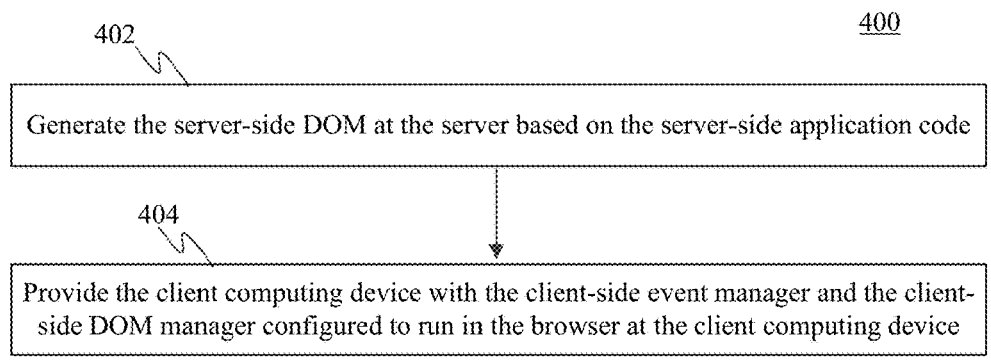
FIG. 4 shows a flowchart providing a process for establishing server-side and client-side DOMs for a web application, according to an example embodiment.

Server-side DOM 122 and client-side DOM 124 are both established in support of web app 136, with client-side DOM 124 configured to mirror server-side DOM 122. For instance, FIG. 4 shows a flowchart 400 providing a process for establishing server-side and client-side DOMs for a web application, according to an example embodiment. In an embodiment, flowchart 400 is performed during step 208 of flowchart 200 when web app 136 is initially executed. Flowchart 400 is described as follows.

In step 402, the server-side DOM is generated at the server based on the server-side application code. As shown in FIG. 1, web app execution engine 138 may contain server-side DOM manager 108 and server-side event manager 116. Web app invoker 302 may cause processor circuit(s) 308 to initiate operation (execute) of server-side DOM manager 108 and server-side event manager 116.

Server-side DOM manager 108 is configured to generate the initial iteration of server-side DOM 122 of FIG. 1. Server-side DOM manager 108 may generate server-side DOM 122 in a similar manner to how a browser generates a DOM for a web application. For example, in an embodiment, server-side DOM manager 108 may parse the markup language portions of server-side app code 112 into an object model that includes nodes (corresponding to objects in server-side app code 112), and may organize the nodes in a tree structure, with each node having attributes and/or properties.

In step 404, the client computing device is provided with the client-side event manager and the client-side DOM manager configured to run in the browser at the client computing device. In an embodiment, web app invoker 302 is configured to transmit a client package 316 to client 104. For example, in an embodiment, web app invoker 302 may transmit client package 316 to client 104 through network 110 over connection 312 maintained by connection manager 310. Client package 316 includes client-side DOM manager 118 and client-side event manager 120, which may each be implemented in one or more browser-compatible programming languages. For example, client-side DOM manager 118 and client-side event manager 120 may be HTML objects coded in JavaScript. A same configuration of client-side DOM manager 118 and client-side event manager 120 may be used for a variety of different web applications (managers 118 and 120 need not be customized for each web app, but instead can be standardized). Client-side DOM manager 118 and client-side event manager 120 may load into browser 106 in any manner. For example, client-side DOM manager 118 and client-side event manager 120 may be executed as a script by browser 106, may be included in a plug-in or add-in to browser 106, may load directly into the code of browser 106, or may be provided to browser 106 in any other manner.

Client-side DOM manager 118 is configured to manage client-side DOM 124, including by directing browser 106 to establish an initial version of client-side DOM 124 when web app 136 is invoked, and to update client-side DOM 124 with modifications provided by server-side DOM manager 108 when server-side DOM 122 is updated.

Client-side event manager 120 is configured to track (and optionally filter) events occurring at browser 106 with regard to client-side DOM 124, and to pass the events to server-side event manager 116 as event indications 126.

Figure 5:
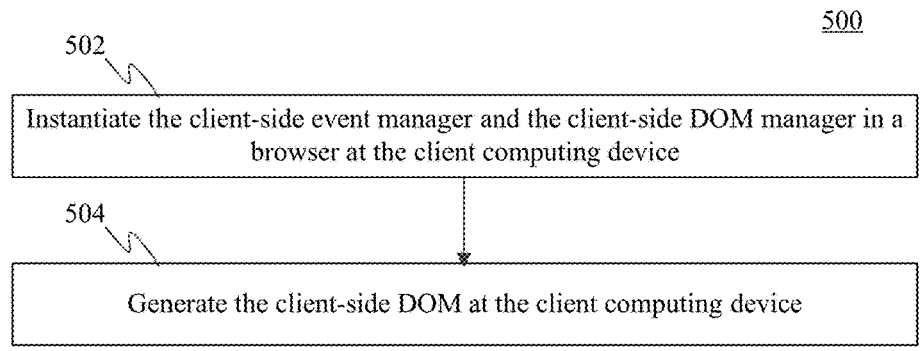
FIG. 5 shows a flowchart providing a process for configuring a client to support a web application that operates based on server-side code execution and client-side events, according to an example embodiment.

For instance, FIG. 5 shows a flowchart 500 providing a process for configuring a client to support a web application that operates based on server-side code execution and client-side events, according to an example embodiment. Flowchart 500 may be performed by browser 106 in an embodiment. Flowchart 500 is described as follows.

In step 502, the client-side event manager and the client-side DOM manager are instantiated in a browser at the client computing device. For example, as shown in FIG. 3, client 104 receives client package 316 from web app invoker 302 at server 102. Browser 106 extracts client-side DOM manager 118 and client-side event manager 120 from client package 316, and executes client-side DOM manager 118 and client-side event manager 120.

In step 504, the client-side DOM is generated at the client computing device. In an embodiment, client-side DOM manager 118 requests information indicating the structure of server-side DOM 122 at server 102 from server-side DOM manager 108. For instance, the information may be provided as a list of nodes, with corresponding attributes/properties, or in another manner. Client-side DOM manager 118 maintains this information as client-side DOM 124 for browser 106. Browser 106 generates and displays (renders) the user interface for web app 136 as defined by client-side DOM 122 in a manner that would be known to persons skilled in the relevant art(s).

Figure 6:
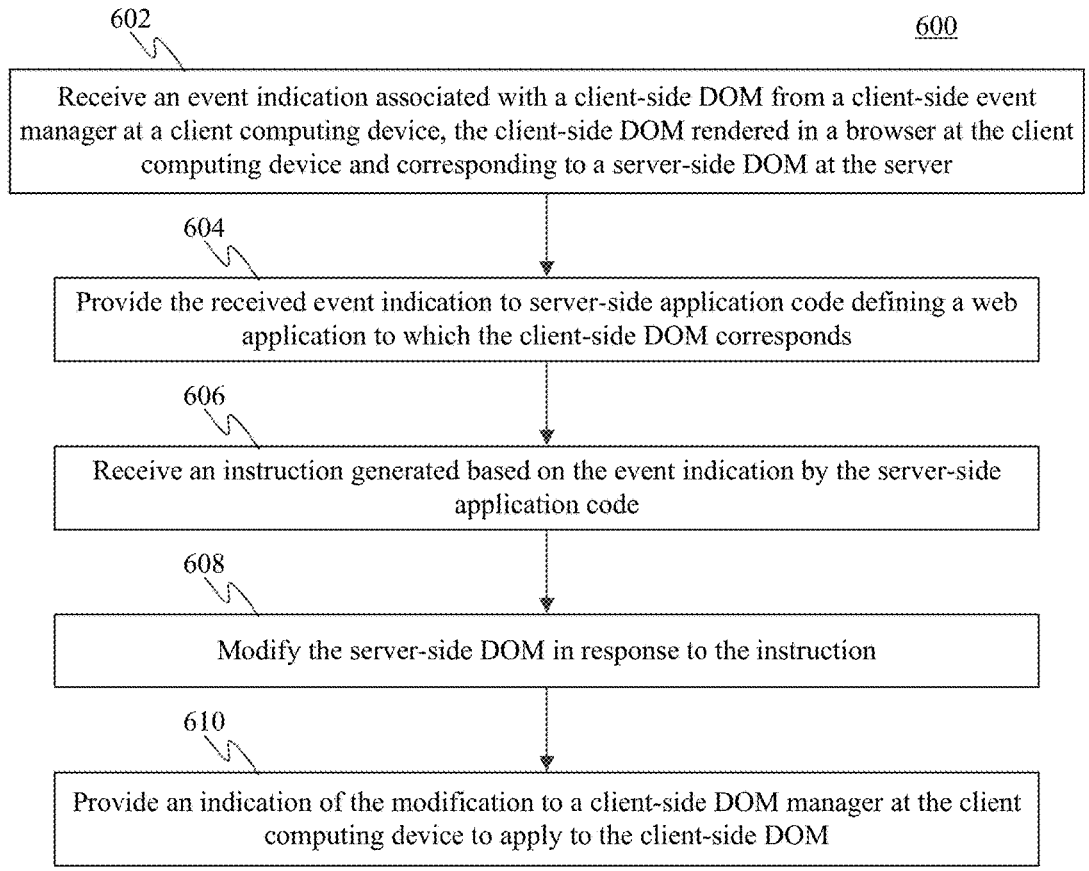
FIG. 6 shows a flowchart providing a process for conducting a client-server web application that operates based on server-side code execution and client-side events, according to an example embodiment.

B. Exemplary Embodiments for Operating a Web Application that has a Server-Side DOM A web application based on a server-side DOM (such as web app 136 of FIG. 1) may operate in various ways, according to embodiments. For instance, FIG. 6 shows a flowchart 600 providing a process for conducting a client-server web application that operates based on server-side code execution and client-side events, according to an example embodiment. For purposes of illustration, flowchart 600 is described with respect to FIG. 1 as follows.

Flowchart 600 of FIG. 6 begins with step 602. In step 602, an event indication associated with a client-side DOM is received from a client-side event manager at a client computing device, the client-side DOM rendered in a browser at the client computing device and corresponding to a server-side DOM at the server. Server-side event manager 116 is configured to receive event indications 126 associated with client-side DOM 124. As described above, a user may interact with browser 106 to interact with web app 136 at client 104. For example, the user may provide mouse clicks, key strokes, voice inputs, haptic inputs, touch inputs, button pushes, etc., via the user interface provided by browser 106. Such interactions with web app 136 may register as input data, selections of items from displayed options, etc. Client-side event manager 120 in browser 106 may register such interactions, and transmit such interactions as event indications 126 to server-side event manager 116. For example, client 104 may track the interactions (e.g., counting mouse clicks, locations of mouse clicks, tracking input alphanumeric characters, etc.) as events, and may transmit event indications 126 (including the tracked events) to server 102 through network 110. Event indications 126 may be transmitted to server 102 each time a new event occurs, on a periodic basis, or according to any other schedule or trigger.

In step 604, the received event indication is provided to server-side application code defining a web application to which the client-side DOM corresponds. Upon receiving event indications 126 from client-side event manager 120 at client 104, server-side DOM manager 108 provides event indications 126 as event indications 128 to server-side app code 112. Note that event indications 128 may include the same events as event indications 126, or may be a filtered version of event indications 126. It is noted that filtering of event indications may be performed by client-side event manager 120 or server-side event manager 116. Such filtering is performed to reduce a number of events tracked by client-side event manager 120 and transmitted from client 104 to server 102, and/or provided by server-side event manager 116 to server-side app code 112.

Figure 7:
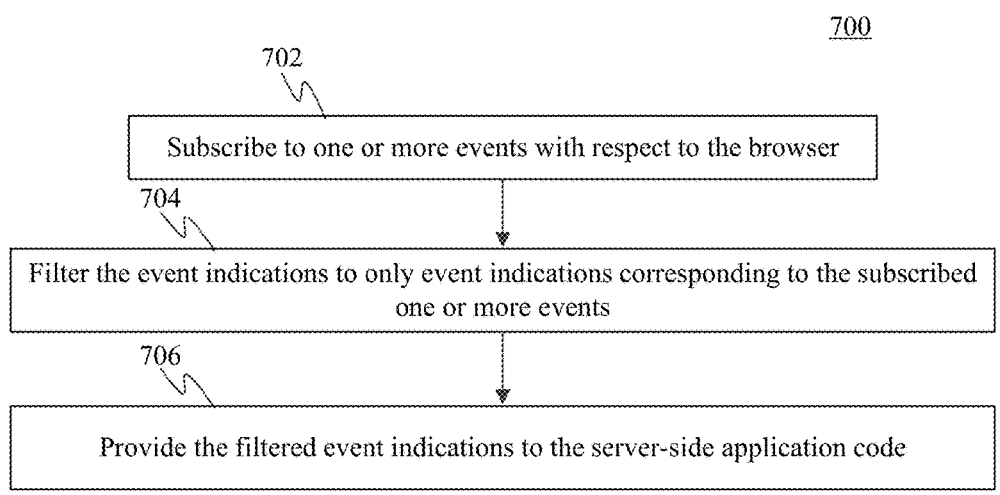
FIG. 7 shows a flowchart providing a process for subscribing to client-side events, according to an example embodiment.

For instance, FIG. 7 shows a flowchart 700 providing a process for subscribing to client-side events, according to an example embodiment. Flowchart 700 may be performed by one or both of client-side event manager 120 and server-side event manager 116. Flowchart 700 is described as follows.

In step 702, one or more events are subscribed to with respect to the browser. In embodiments, server-side app code 112 of web app 136 may be interested in a subset of all possible events performable at browser 106. This is because there may be hundreds, thousands, or even greater numbers of possible events (e.g., mouse clicks, keystrokes, button pushes, etc.), and web app 136 may be considered to consider only a subset of these as inputs. Accordingly, these events may be subscribed to by web app 136, and indicated as subscribed at client-side event manager 120 and/or server-side app code 112. In this manner, client-side event manager 120 and/or server-side app code 112 are aware of the subset of event types of interest, and can ignore/filter the rest.

In step 704, the event indications are filtered to only event indications corresponding to the subscribed one or more events. In an embodiment, client-side event manager 120 may filter events occurring with respect to web app 136 at browser 106, such as by receiving each event, comparing it to the list of subscribed events, and discarding the event if not subscribed to. Only the non-discarded events are included in event indications 126. Alternatively, event indications 126 may include all events occurring with respect to web app 136 at browser 106, and server-side event manager 116 may perform the event filtering at server 102.

In step 706, the filtered event indications are provided to the server-side application code. In step 704, the event filtering may be performed by client-side event manager 120 and/or server-side app code 112. In either case, only the filtered events are included in event indications 128 provided by server-side event manager 116 and received by server-side app code 112.

Referring back to flowchart 600 of FIG. 6, in step 606, an instruction generated by the server-side application code based on the event indication is received. As described above, server-side app code 112 generates instructions 130 based at least on event indications 128. The events such as mouse clicks, mouse moves, key selections, etc., are processed by server-side app code 112 as inputs, which cause changes to server-side DOM 122 (e.g., node changes, property changes like colors, fonts, etc.). For example, event indications 128 may indicate a mouse click on a check box. Server-side app code 112 may process the mouse click on the check box as an input to a method, which causes one or more changes to be applied to server-side DOM 122, such as a color change for a symbol, new text to be displayed, etc. Instructions 130 are generated to define the one or more changes for application to server-side DOM 122.

In step 608, the server-side DOM is modified in response to the instruction. Instructions 130 may cause modifications to server-side DOM 122. As described above, server-side app code 112 of web app 136 is configured to address and manipulate the objects of server-side DOM 122 according to instructions 130. Server-side app code 122 is capable of adding, changing, and/or removing any of the HTML (or other markup language) elements and attributes in a page of web app 136. Furthermore, server-side app code 122 can change all the CSS (cascading style sheets) styles in web app 136, can react to all events occurring at browser 106 with respect to web app 136, and can create new events in web app 136.

Accordingly, server-side DOM manager 108 is configured to modify server-side DOM 122 in response to instructions 130 from server-side app code 112. Instructions 130 may be provided to server-side DOM 122 in any manner, such as in the form of an API call. Instructions 130 can add, change, and/or remove elements and attributes of web app 136, change the CSS, styles in web app 136, and make any other additions, deletions, and/or modifications to the elements and attributes of web app 136 (as traditionally performed by web browsers).

In step 610, an indication of the modification is provided to a client-side DOM manager at the client computing device to apply to the client-side DOM. As described above, change tracker 114 is configured to track modifications 132 made to server-side DOM 122 by server-side DOM manager 108 in accordance with instructions 130. Modifications 132 indicate all additions, deletions, and/or modifications made to the object model of server-side DOM 122. For example, modifications 132 may indication an identifier for any changed/added/deleted node, an indication of the modification for each identified node, indications of any changed attributes, and/or any other modifications. Change tracker 114 is configured to provide indications of the tracked modifications 132 to client 104 as modification indications 134.

Modification indications 134 are transmitted by change tracker 114 to client-side DOM manager 118 to be made in client-side DOM 124, which is rendered in accordance with the modifications by browser 106 for display to the user.

For example, as described above, client-side DOM manager 118 at client 104 receives modification indications 134. Browser 106 renders client-side DOM 124 according to modification indications 134 to synchronize client-side DOM 124 with server-side DOM 122. In this manner, browser 106 updates client-side DOM 124 whenever client-side DOM manager 118 receives modification indications 134.

Note that additionally or alternatively, server-side app code 112 may receive events from entities other than client-side DOM 124 (from a "non-client-side DOM entity"). For instance, one or more applications internal to server 102 and/or external to server 102 (e.g., coupled to server 102 over a network) may provide events to server-side app code 112. Examples of such applications include a chat application (e.g., an instant message event), an email tool (e.g., an email message event), a calendar application (e.g., a reminder alert event), a stock tracker application (e.g., a stock price change event), etc. In response to such one or more such events, server-side app code 112 may generate instructions 130. Instructions 130 may be generated based on the occurrence of the event (e.g., an email message being sent or received), and/or on the contents of the event (e.g., the contents of the email message). Instructions 130 cause server-side DOM manager 108 to modify server-side DOM 122. As described above, change tracker 114 receives and tracks modifications 132 made to server-side DOM 122 by server-side DOM manager 108, and thus determines that server-side DOM 122 has been modified by the event(s). Change tracker 114 provides an indication of the tracked modifications 132 to client 104 as modification indications 134. Browser 106 at client 104 receives modification indications 134, and client-side DOM manager 118 is configured to update client-side DOM 124 based on the received modification indications 134 as described above.

Accordingly, server-side app code 112 may generate instructions 130 independently of events occurring at client-side DOM 124, or may generate instructions 130 based on a combination of events at client-side DOM 124 and at one or more other entities. Instructions 130 cause modifications first to server-side DOM 122, then to client-side DOM 124, in a similar manner as described above for instructions generated based solely upon client-side DOM events. Browser 106 renders the modified client-side DOM 124 for display and interaction in browser 106.

C. Exemplary Server-Side Web Application Code

According to embodiments, a web application may include web application code that runs on the server-side with respect to a server-side DOM, which enables developers that are proficient with server-side programming languages and frameworks to develop browser-accessible web applications using such languages and frameworks, rather than having to master browser-based programming languages.

An example of server-side application code is shown below for purposes of illustration:

```
public class IncrementCounterPage : Page
{
    private int counter;
    HtmlDiv counterDiv = new HtmlDiv( );
    public override void Start( )
    {
        Document.Body.Children.Add(counterDiv);
        counterDiv.Style.BackgroundColor =
        WellKnownColor.DarkOrange;
        counterDiv.Style.Color = WellKnownColor.White;
        counterDiv.OnClick += Increment_OnClick;
        UpdateView( );
    }
    private void UpdateView( )
    {
        counterDiv.InnerText = string.Format("Clicks count: {0}",
        counter);
    }
    private void Increment_OnClick(object sender, EventArgs e)
    {
        counter++;
        UpdateView( );
    }
}
```

The above example program code is written in a server-side programming language (C#), and therefore may be run in a server, while utilizing a client-side browser as a user interface according to the embodiments described herein. Traditionally, such program code would be programmed in a browser-compatible language (e.g., JavaScript) and executed directly in a browser.

In this server-side code, "HtmlDiv( )" is an object (a C# clause) that is created the server-side DOM and has the form of a tree. "counterDiv" is added as a child of the DOM tree. Properties such as "Style.BackgroundColor" and "Style.Color" are set in a start function for "counterDiv". An event, "OnClick", is subscribed to that corresponds to a mouse click in the browser. A class "UpdateView( )" is called that displays a count of mouse clicks. Whenever the event "OnClick" is detected at the browser, this server-side code increments the property "counter", and "UpdateView" is called to update the displayed count of mouse clicks.

In particular, with reference to FIG. 1, the above example code may be executed in server 102 as server-side app code 112 to define an example of web app 136. Server-side DOM manager 108 may generate a server-side DOM 122 based on this program code, which may be mirrored in browser 106 as client-side DOM 124. Initial settings made to server-side DOM 122 by server-side DOM manager 108 based on instructions from this program code (e.g., setting background color, etc.), are tracked by change tracker 114, and transmitted as modification indications 134 to client-side DOM manager 118, which mirrors the changes in client-side DOM 124 based thereon.

During operation of this example of web app 136, client-side event manager 120 tracks events (e.g., mouse click) related to the user interface rendered by browser 106 based on client-side DOM 124. The events are transmitted as event indications 126 to server-side event manager 116, which provides the events to server-side app code 112 as event indications 128. Server-side app code 112 generates instructions 130 (e.g., update displayed "counter" value") for server-side DOM manager 108 to execute on server-side DOM 122, and this change is mirrored to client-side DOM 124 as described.

In this manner, processing by the web application is performed by server-side app code 112, using processing resources of server 102 (e.g., processing circuit(s) 308 in FIG. 3), relying less on processing resources client 104.

Browser 106 is used more as a user interface for the web application and less as an execution engine. Accordingly, developers familiar with server-side programming languages and frameworks are enabled to generate web applications using such languages and frameworks, while making the web apps accessible to users in web browsers.

III. Example Mobile and Stationary Device Embodiments

Server 102, client 104, browser 106, server-side DOM manager 108, server-side app code 112, change tracker 114, server-side event manager 116, client-side DOM manager 118, client-side event manager 120, web app 136, web app execution engine 138, web app invoker 302, processor circuit(s) 308, connection manager 310, flowchart 200, flowchart 400, flowchart 500, flowchart 600, and flowchart 700 may be implemented in hardware, or hardware combined with software and/or firmware. For example, browser 106, server-side DOM manager 108, server-side app code 112, change tracker 114, server-side event manager 116, client-side DOM manager 118, client-side event manager 120, web app 136, web app execution engine 138, web app invoker 302, connection manager 310, flowchart 200, flowchart 400, flowchart 500, flowchart 600, and/or flowchart 700 may be implemented as computer program code/instructions configured to be executed in one or more processors and stored in a computer readable storage medium. Alternatively, browser 106, server-side DOM manager 108, server-side app code 112, change tracker 114, server-side event manager 116, client-side DOM manager 118, client-side event manager 120, web app 136, web app execution engine 138, web app invoker 302, connection manager 310, flowchart 200, flowchart 400, flowchart 500, flowchart 600, and/or flowchart 700 may be implemented as hardware logic/electrical circuitry.

For instance, in an embodiment, one or more, in any combination, of browser 106, server-side DOM manager 108, server-side app code 112, change tracker 114, server-side event manager 116, client-side DOM manager 118, client-side event manager 120, web app 136, web app execution engine 138, web app invoker 302, processor circuit(s) 308, connection manager 310, flowchart 200, flowchart 400, flowchart 500, flowchart 600, and/or flowchart 700 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
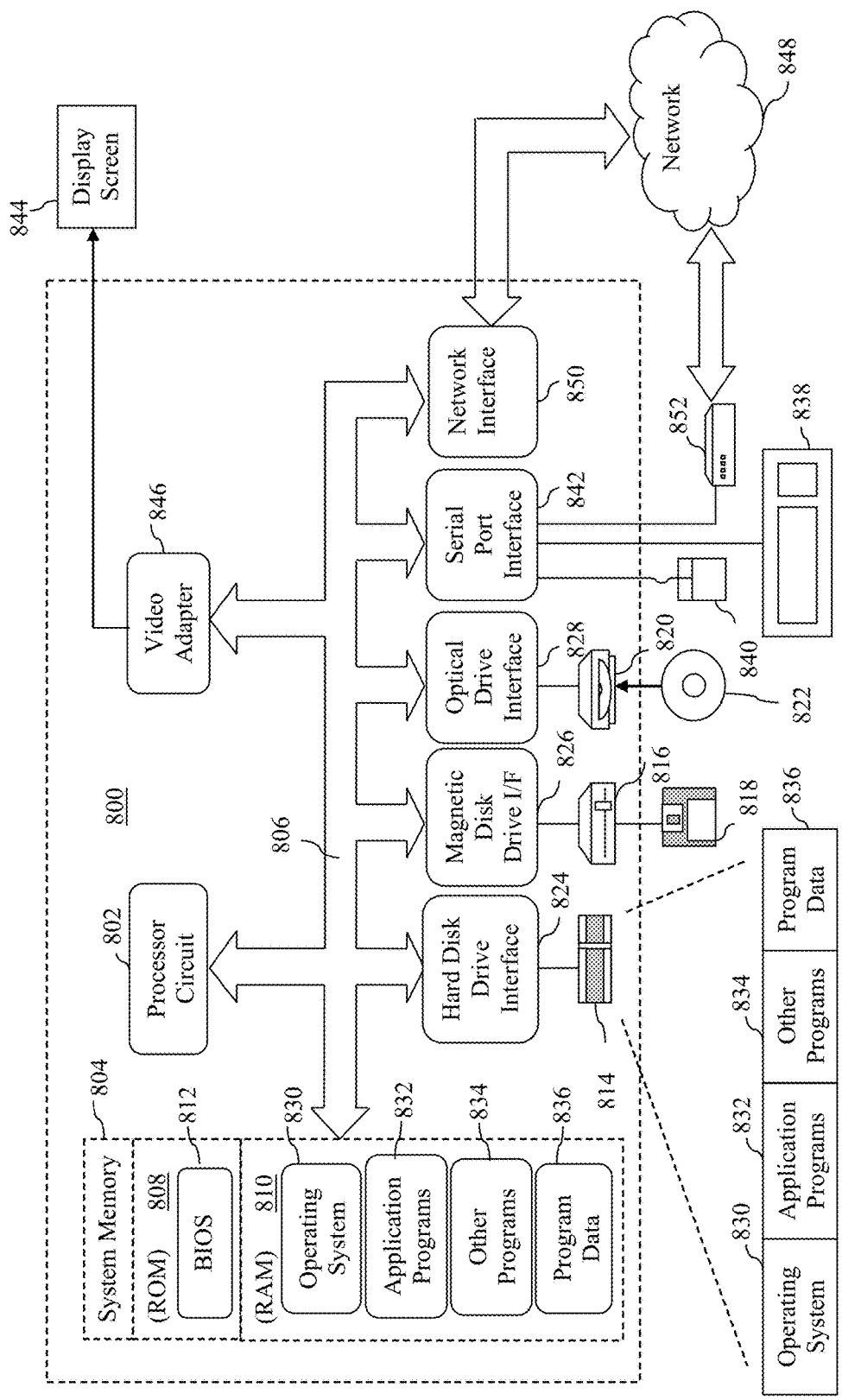
FIG. 8 shows a block diagram of an example computing device that may be used to implement embodiments.

FIG. 8 depicts an exemplary implementation of a computing device 800 in which embodiments may be implemented. For example, server 102 or client 104 may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing browser 106, server-side DOM manager 108, server-side app code 112, change tracker 114, server-side event manager 116, client-side DOM manager 118, client-side event manager 120, web app 136, web app execution engine 138, web app invoker 302, connection manager 310, flowchart 200, flowchart 400, flowchart 500, flowchart 600, and/or flowchart 700 (including any suitable step of flowcharts 200, 400, 500, 600, 700), and/or further embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adaptor 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including memory 1220 of FIG. 12). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Further Example Embodiments

In an embodiment, a method in a server comprises: receiving an event indication associated with a client-side DOM (document object model) from a client-side event manager at a client computing device, the client-side DOM rendered in a browser and corresponding to a server-side DOM at the server; providing the received event indication to server-side application code defining a web application to which the client-side DOM corresponds; receiving an instruction generated based on the event indication by the server-side application code; modifying the server-side DOM in response to the instruction; and providing an indication of the modification to a client-side DOM manager at the client to apply to the client-side DOM.

In an embodiment, the method further comprises: initiating the web application at the server and client computing device prior to said receiving the event indication.

In an embodiment, the initiating comprises: receiving a request for a uniform resource locator (URL) from the client computing device; resolving the URL to the web application; copying the server-side application code into memory in response to said resolving; and invoking the server-side application code.

In an embodiment, the said initiating comprises: generating the server-side DOM at the server based on the server-side application code; and providing the client computing device with the client-side event manager and the client-side DOM manager configured to run in the browser at the client computing device, the client-side DOM manager configured to generate the client-side DOM at the client computing device.

In an embodiment, the method further comprises: subscribing to one or more events with respect to the browser; and wherein said providing the received event indication to a server-side application code defining a web application comprises: filtering the event indications to only event indications corresponding to the subscribed one or more events; and providing the filtered event indications to the server-side application code.

In an embodiment, the client-side event manager and the client-side DOM manager include JavaScript program code and the server-side application code includes server language program code.

In an embodiment, the method further comprises: opening a connection between the client computing device and server according to a bi-directional protocol; and maintaining open the connection between the client computing device and server for multiple iterations of transmissions of event indications from the client computing device to the server and transmissions of modification indications from the server to the client computing device.

In another embodiment, a server that includes at least one processor circuit and memory comprises: a server-side DOM (document object model) manager configured to manage a server-side DOM at the server for a web application, the server-side DOM manager configured to modify the server-side DOM in response to instructions from server-side application code defining the web application; a change tracker configured to track modifications made to the server-side DOM by the server-side DOM manager, and to provide indications of the tracked modifications to a client computing device that includes a browser that renders a client-side DOM corresponding to the server-side DOM, the browser configured to implement the tracked modifications in the client-side DOM; and a server-side event manager configured to receive event indications associated with the client-side DOM from the browser, and provide the event indications to the server-side application code, the server-side application code generating the instructions based at least on the event indications.

In an embodiment, wherein the server further comprises: a web application invoker configured to invoke the web application at the server.

In an embodiment, the web application invoker is configured to: receive a request for a uniform resource locator (URL) from the client computing device; resolve the URL to the web application; copy the server-side application code into memory in response to said resolving; and invoke the server-side application code.

In an embodiment, the server-side DOM manager is configured to generate the server-side DOM at the server based on the server-side application code; and the web application invoker is configured to provide the client computing device with the client-side event manager and the client-side DOM manager configured to run in the browser at the client computing device, the client-side DOM manager configured to generate the client-side DOM at the client computing device.

In an embodiment, the event manager is configured to subscribe to one or more events with respect to the browser, filter the received event indications to only event indications corresponding to the subscribed one or more events, and provide the filtered event indications to the server-side application code.

In an embodiment, the client-side event manager and the client-side DOM manager include JavaScript program code and the server-side application code includes server language program code.

In an embodiment, the server further comprises: a connection manager configured to open a connection between the client computing device and server according to a bi-directional protocol, and maintain open the connection between the client computing device and server for multiple iterations of transmissions of event indications from the client computing device to the server and transmissions of modification indications from the server to the client computing device.

In another embodiment, a computing device comprises: at least one processor circuit; and a memory that stores program code configured to be executed by the at least one processor circuit to perform operations, the operations including: receiving an event indication associated with a client-side DOM (document object model) from a client-side event manager at a client computing device, the client-side DOM rendered in a browser at the client computing device and corresponding to a server-side DOM at the server; providing the received event indication to server-side application code defining a web application to which the client-side DOM corresponds; receiving an instruction generated based on the event indication by the server-side application code; modifying the server-side DOM in response to the instruction; and providing an indication of the modification to a client-side DOM manager at the client computing device to apply to the client-side DOM.

In an embodiment, the operations further comprise: initiating the web application at the server and client computing device prior to said receiving the event indication.

In an embodiment, the initiating comprises: receiving a request for a uniform resource locator (URL) from the client computing device; resolving the URL to the web application; copying the server-side application code into memory in response to said resolving; and invoking the server-side application code.

In an embodiment, the initiating comprises: generating the server-side DOM at the server based on the server-side application code; and providing the client computing device with the client-side event manager and the client-side DOM manager configured to run in the browser at the client computing device, the client-side DOM manager configured to generate the client-side DOM at the client computing device.

In an embodiment, the operations further comprise: subscribing to one or more events with respect to the browser;

and wherein said providing the received event indication to server-side application code defining a web application comprises: filtering the event indications to only event indications corresponding to the subscribed one or more events; and providing the filtered event indications to the server-side application code.

In an embodiment, the operations further comprise: opening a connection between the client computing device and server according to a bi-directional protocol; and maintaining open the connection between the client computing device and server for multiple iterations of transmissions of event indications from the client computing device to the server and transmissions of modification indications from the server to the client computing device.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a server, comprising:
   transmitting to a client computing device a client-side event manager configured to track events at the client computing device and a client-side DOM (document object model) manager configured to run in a browser at the client computing device, the client-side DOM manager configured to generate a client-side DOM at the client computing device;
   receiving an event indication associated with the client-side DOM from the client-side event manager at the client computing device, the client-side DOM rendered in the browser and corresponding to a server-side DOM at the server;
   filtering the received event indication, said filtering comprising determining the received event indication corresponds to a subset of event types of interest;
   providing the filtered event indication to server-side application code defining a web application to which the client-side DOM corresponds;
   receiving an instruction generated based on the filtered event indication by the server-side application code;
   modifying the server-side DOM in response to the instruction; and
   providing an indication of the modification to a client-side DOM manager at the client to apply to the client-side DOM.

2. The method of claim 1, further comprising:
   initiating the web application at the server and client computing device prior to said receiving the event indication.

3. The method of claim 2, wherein said initiating comprises:
   receiving a request for a uniform resource locator (URL) from the client computing device;
   resolving the URL to the web application;
   copying the server-side application code into memory in response to said resolving; and
   invoking the server-side application code.

4. The method of claim 2, wherein said initiating comprises:
   generating the server-side DOM at the server based on the server-side application code.

5. The method of claim 1, further comprising:
   subscribing to one or more events with respect to the browser; and
   wherein said filtering the received event indication comprises:
   filtering the received event indication to only event indications corresponding to the subscribed one or more events.

6. The method of claim 1, wherein the client-side event manager and the client-side DOM manager include JavaScript program code and the server-side application code includes server language program code.

7. The method of claim 1, further comprising:
   receiving a second instruction generated by the server-side application code based on a second event indication received by the server-side application code from a non-client-side DOM entity, the non-client DOM entity having generated the second event indication based on at least one event at the non-client DOM entity;
   modifying the server-side DOM in response to the second instruction; and
   providing to the client-side DOM manager, to apply the client-side DOM, an indication of the modification to the server-side DOM made in response to the second instruction.

8. A server that includes at least one processor circuit and memory, comprising:
   a web application invoker configured to transmit to a client computing device a client-side event manager configured to track events at the client computing device and a client-side DOM (document object model) manager configured to run in a browser at the client computing device, the client-side DOM manager configured to generate a client-side DOM at the client computing device;
   a server-side DOM manager configured to manage a server-side DOM at the server for a web application, the server-side DOM manager configured to modify the server-side DOM in response to instructions from server-side application code defining the web application;
   a change tracker configured to track modifications made to the server-side DOM by the server-side DOM manager, and to provide indications of the tracked modifications to a client computing device that includes a browser that renders a client-side DOM corresponding to the server-side DOM, the browser configured to implement the tracked modifications in the client-side DOM; and
   a server-side event manager configured to:
   receive event indications associated with the client-side DOM from the browser;
   filter the received event indications by determining the received event indications correspond to a subset of event types of interest; and
   provide the filtered event indications to the server-side application code, the server-side application code generating the instructions based at least on the filtered event indications.

9. The server of claim 8, wherein the web application invoker is configured to:
   invoke the web application at the server.

10. The server of claim 9, wherein the web application invoker is configured to:
receive a request for a uniform resource locator (URL) from the client computing device;
resolve the URL to the web application;
copy the server-side application code into memory in response to said resolving; and
invoke the server-side application code.

11. The server of claim 9, wherein the server-side DOM manager is configured to generate the server-side DOM at the server based on the server-side application code.

12. The server of claim 8, wherein the event manager is configured to subscribe to one or more events with respect to the browser, and filter the received event indications to only event indications corresponding to the subscribed one or more events.

13. The server of claim 8, wherein the client-side event manager and the client-side DOM manager include JavaScript program code and the server-side application code includes server language program code.

14. The server of claim 8, further comprising:
a connection manager configured to open a connection between the client computing device and server according to a bi-directional protocol, and maintain open the connection between the client computing device and server for multiple iterations of transmissions of event indications from the client computing device to the server and transmissions of modification indications from the server to the client computing device.

15. A computing device, comprising:
at least one processor circuit; and
a memory that stores program code configured to be executed by the at least one processor circuit to perform operations, the operations including:
transmitting to a client computing device a client-side event manager configured to track events at the client computing device and a client-side DOM (document object model) manager configured to run in a browser at the client computing device, the client-side DOM manager configured to generate a client-side DOM at the client computing device;
receiving an event indication associated with the client-side DOM from the client-side event manager at the client computing device, the client-side DOM rendered in the browser at the client computing device and corresponding to a server-side DOM at the server;
filtering the received event indication, said filtering comprising determining the received event indication corresponds to a subset of event types of interest;
providing the filtered event indication to server-side application code defining a web application to which the client-side DOM corresponds;
receiving an instruction generated based on the filtered event indication by the server-side application code;
modifying the server-side DOM in response to the instruction; and
providing an indication of the modification to a client-side DOM manager at the client computing device to apply to the client-side DOM.

16. The computing device of claim 15, wherein the operations further comprise:
initiating the web application at the server and client computing device prior to said receiving the event indication.

17. The computing device of claim 16, wherein said initiating comprises:
receiving a request for a uniform resource locator (URL) from the client computing device;
resolving the URL to the web application;
copying the server-side application code into memory in response to said resolving; and
invoking the server-side application code.

18. The computing device of claim 16, wherein said initiating comprises:
generating the server-side DOM at the server based on the server-side application code.

19. The computing device of claim 15, wherein the operations further comprise:
subscribing to one or more events with respect to the browser; and
wherein said filtering the received event indication comprises:
filtering the received event indication to only event indications corresponding to the subscribed one or more events.

20. The computing device of claim 15, wherein the operations further comprise:
opening a connection between the client computing device and server according to a bi-directional protocol; and
maintaining open the connection between the client computing device and server for multiple iterations of transmissions of event indications from the client computing device to the server and transmissions of modification indications from the server to the client computing device.

* * * * *